United States Patent
Saito et al.

(10) Patent No.: US 6,535,557 B1
(45) Date of Patent: Mar. 18, 2003

(54) METHOD AND APPARATUS FOR CODING MOVING PICTURE IMAGE

(75) Inventors: Tadao Saito, Yokohama (JP); Hitoshi Aida, Kawasaki (JP); Terumasa Aoki, Kamifukuoka (JP); Takayuki Ohnishi, Tokyo (JP)

(73) Assignee: The University of Tokyo, Tokyo (JP)

( * ) Notice: Subject to any disclaimer, the term of this patent is extended or adjusted under 35 U.S.C. 154(b) by 0 days.

(21) Appl. No.: 09/390,702

(22) Filed: Sep. 7, 1999

(30) Foreign Application Priority Data

Dec. 7, 1998 (JP) .......................................... 10-346368

(51) Int. Cl.⁷ ................................................ H04N 7/10
(52) U.S. Cl. ................................................... 375/240.1
(58) Field of Search .................................. 348/500, 501, 348/508, 521, 522, 571, 575, 608; 375/135, 146, 220, 240.1, 240.01, 240.24, 240.25, 240.18; 725/105, 114, 116

(56) References Cited

U.S. PATENT DOCUMENTS

| | | | | |
|---|---|---|---|---|
| 5,561,466 A | * | 10/1996 | Kiriyama | 375/240.25 |
| 5,568,478 A | * | 10/1996 | Van Loo, Jr. et al. | 370/392 |
| 5,608,446 A | * | 3/1997 | Carr et al. | 725/114 |
| 5,886,989 A | * | 3/1999 | Evans et al. | 370/347 |
| 6,226,327 B1 | * | 5/2001 | Igarashi et al. | 375/240.14 |

FOREIGN PATENT DOCUMENTS

| | | |
|---|---|---|
| JP | 08-331559 A | 12/1996 |
| JP | 09-187007 A | 7/1997 |

OTHER PUBLICATIONS

Joao B.D. Cabrera et al, An Adaptive Weighted TDM Scheduler for Video Transport in ATM Networks, Aug. 1998, IEEE, 2, 2141–2142.*

Vasudevan Parthasarathy et al., Design of a Transport Coding Scheme for High–Quality Video over ATM Networks, Apr. 1997, IEEE, 7, 358–376.*

Kogyo–Chosaki, *All of MPEG–4 coding various images and sounds freely*. Sep. 30, 1998, pp 101–105.

*MPEG–2 stream control for various bit rate TDM switch*, Sep. 7, 1998.

* cited by examiner

Primary Examiner—Chris Kelley
Assistant Examiner—Behrooz Senfi
(74) Attorney, Agent, or Firm—Oliff & Berridge, PLC (57) ABSTRACT

In a method for coding a moving picture image, in which the moving picture image is coded into a digital moving picture stream when the moving picture image is transmitted via a network, the moving picture image is coded in such a manner that a data unit including a synchronous signal corresponds or conforms to a data transmission unit on the network, or, the moving picture image is coded in such a manner that a synchronous signal is included in a position near a head of respective data transmission units on the network. Therefore, in the digital moving picture stream generated according to the invention, the header of the synchronous layer is included in every maximum length of the IP packet in the variable length packet switching method and in every size of the time slots in the variable bit rate TDM.

6 Claims, 7 Drawing Sheets

Bit amount prediction method

FIG. 2b

* In the case that buffer exceeds target bit amount due to prediction miss

FIG. 3

Roll-back method

FIG. 4a  FIG. 4b

Excess bit carry-over method

Examples of time slot output in this method (Roll-back method)

FIG. 7

METHOD AND APPARATUS FOR CODING MOVING PICTURE IMAGE

BACKGROUND OF THE INVENTION

1. Field of the Invention

The present invention relates to a moving picture coding method for coding a moving picture image and a moving picture coding apparatus used for this method, and more particularly relates to a method and apparatus for coding a moving picture image used preferably for transmitting the moving picture image via a network by utilizing a variable length packet switching method or a variable bit rate TDM switching method.

2. Description of Related Art

Generally, in the case that a moving picture image is transmitted via a network, the moving picture image is coded with compression by means of for example MPEG (Moving Picture Experts Group) coding method, and the thus coded digital moving picture stream data are transmitted via the network by utilizing a variable length packet switching method (IP network) or a variable bit rate TDM (Time Division Multiplex) switching method.

Figure 6:
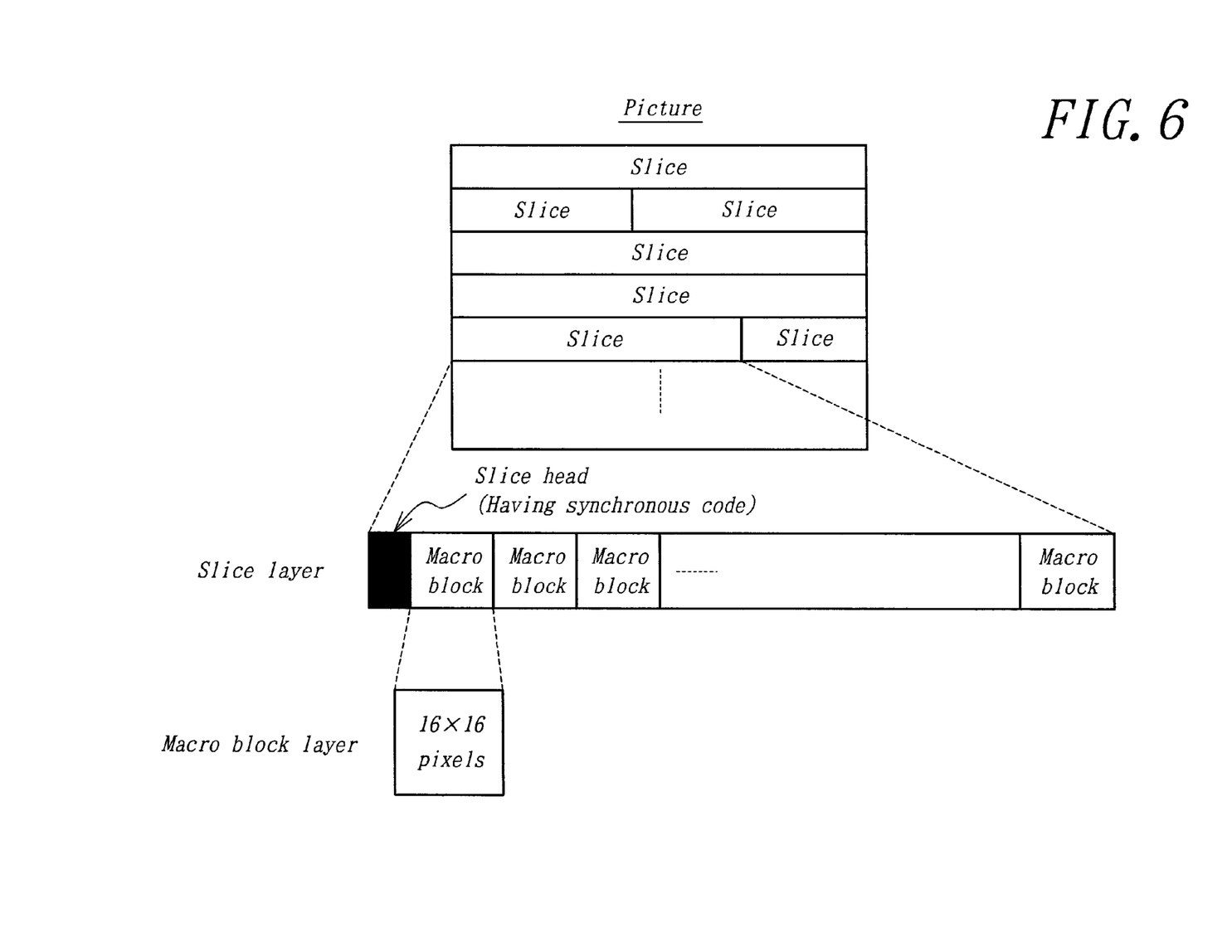
FIG. 6 is a schematic view illustrating one embodiment of a hierarchical structure of an MPEG picture.

Here, the MPEG coding method is an established standard as a method for coding a moving picture image. In the MPEG coding method, a highly effective compression is achieved by performing a motion vector prediction in forward and backward directions of the picture in addition to a picture compression of respective pictures by means of DCT and by performing a coding by utilizing a time interval of the moving picture image. FIG. 6 is a schematic view showing the known hierarchical structure of MPEG picture. A piece of pictures comprises a plurality of slices. The slice is a minimum unit of data row having a synchronous code, and comprises a layer of macro blocks each having 16×16 pixels (arbitrary in MPEG1 and arbitrary length not crossing both side ends of picture in MPEG2). In the embodiment shown in FIG. 6, a synchronous code of a slice header includes a vertical information, and the coordinates in the picture can be determined from the synchronous code and that of the macro block continued to the slice header. Moreover, various predictions due to differential coding are all cleared as zero.

Moreover, the IP network is a variable length packet switching method which is a de facto standard by a development of internet. A switchboard (router) determines a route on the basis of an address (IP address) described in a header of the packet. A maximum packet length is determined corresponding to the network to be used.

Figure 7:
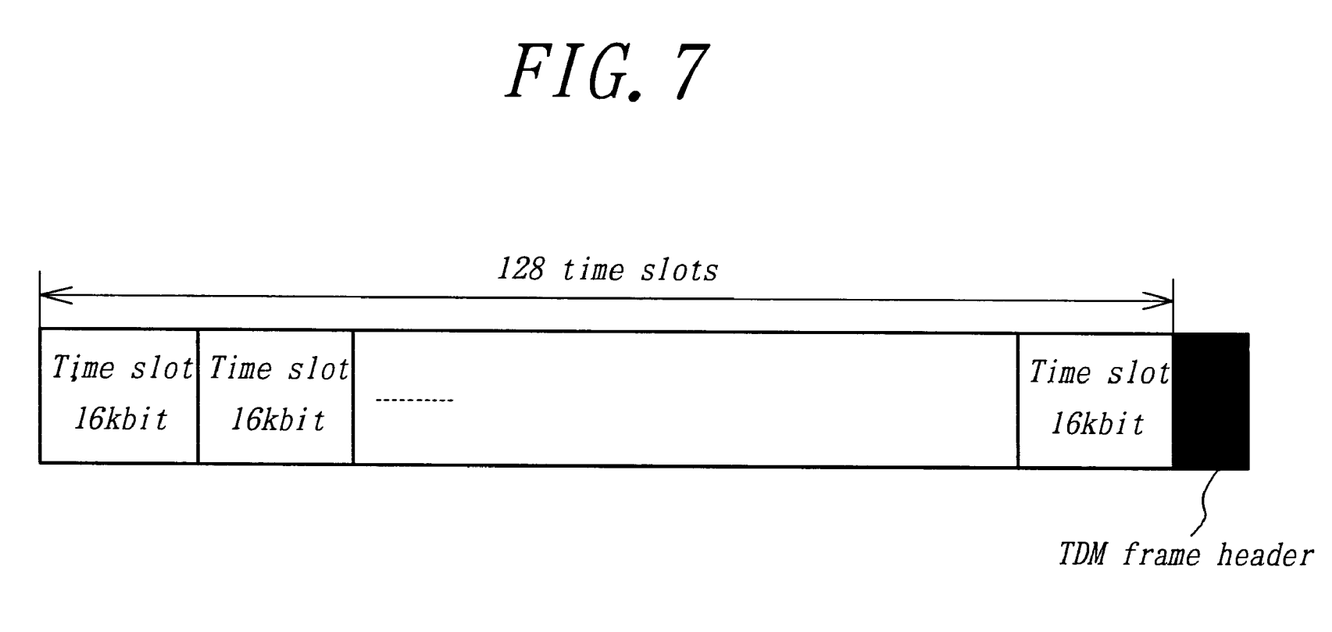
FIG. 7 is a schematic view explaining one embodiment of the variable bit rate TDM switching method.

Further, the variable bit rate TDM switching method performs a switching operation by storing data in a time slot having fixed length provided in TDM frame, as shown in FIG. 7. As being different from the existing TDM switchboard, since the number of slots assigned to respective traffics is varied in response to the bit rate necessary at that time, it is possible to handle multi rate and variable bit rate traffics. Furthermore, it is possible to solve a problem about overhead or switching rate which is a problem in ATM switchboard by making a slot size larger corresponding to the network exclusive for the picture image, and also it is easy to achieve an assurance of synchronicity and a reduction of delay flicker by utilizing the TDM method. Moreover, it is possible to perform a control for optimizing a video quality in the switchboard, if the switchboard comprehends data contents stored in the time slot (correspondence with a video frame).

As mentioned above, in the case that the moving picture image is coded by means of the MPEG coding method utilizing the existing coding device and is transmitted by utilizing the IP network, there are following problems.

(1) Problems at receiving side due to data loss in the network:

When an MPEG stream is transmitted via the network, an existing encoder performs the coding irrelevant to a data transmission unit of the network, and the coded data are divided unconditionally irrelevant to the stream structure and are transmitted via the network. Therefore, in the case that a loss of packet or time slot occurs in the network, a stream unconformity occurs at a receiving side on and after a data drop portion. Such a loss of packet and time slot may also occur when the packet and so on can not be transmitted due to a network congestion or when the packet and so on can not be received due to a transmission error. In this case, since a variable length coding having no synchronous code is used in a macro block level, it is possible to perform a decode synchronizing at the receiving side, ant thus the decode synchronizing is maintained at a deteriorated state till the slice header including a synchronous point appears. Therefore, a decode algorithm is broken down, so that a larger distortion occurs in a decoded picture image.

(2) Problems on decoder at receiving side:

In the decoder at the receiving side, even if a loss of incoming data occurs, it is thought to be possible to perform an interpolation treatment of the data loss portion by utilizing nearby pixels or a picture in a previous frame. However, if the synchronicity is deteriorated due to the data loss, it is difficult to perform for example a detection of the data loss, a detection of the data loss region and so on, and thus the interpolation treatment can hardly be performed.

SUMMARY OF THE INVENTION

An object of the present invention is to eliminate the drawbacks mentioned above and to provide a method and apparatus for coding a moving picture image in which, even if a packet and a time slot are disposed on the network, it is possible to maintain a synchronicity at a receiving side or it is possible to rapidly recover the synchronicity at the receiving side.

According to the invention, a method for coding a moving picture image, in which the moving picture image is coded into a digital moving picture stream when the moving picture image is transmitted via a network, comprises a step of; coding the moving picture image in such a manner that a data unit including a synchronous signal corresponds or conforms to a data transmission unit on the network, or comprises a step of; coding the moving picture image in such a manner that a synchronous signal is included in a position near a head of respective data transmission units on the network.

Moreover, in a preferred embodiment of the method for coding a moving picture image according to the invention, a correspondence between the data unit and the data transmission unit is a conformity between the data unit and the data transmission unit, the network utilizes a variable length packet switching method such as an IP network or a variable bit rate TDM (Time Division Multiplex) method, and the coding of the moving picture image is based on MPEG (Moving Picture Experts Group) method.

Further, according to the invention, an apparatus for coding a moving picture image, comprises; an asynchronous layer encoder for performing a coding operation of the moving picture image till an uppermost layer having no synchronicity, in a hierarchical structure of a moving picture compression method; a buffer for storing coded data outputted from the asynchronous layer encoder in order; a synchronous layer encoder for picking up the coded data stored in the buffer and performing a coding operation of the moving picture image of a layer having synchronicity and till a layer positioned upper than that layer by inserting the synchronous signal, to obtain a digital moving picture stream; and a synchronous layer generation controller for observing a data amount of the coded data stored in the buffer and generating a coding instruction to the synchronous layer encoder when the data amount reaches to the data transmission unit on the network.

Furthermore, in a preferred embodiment of the apparatus for coding a moving picture image according to the invention, the generation of the coding instruction in the synchronous layer generation controller is performed by; (1) observing a bit amount generated from an output of the asynchronous layer encoder in each time; and predicting a timing at which the bit amount exceeds a target bit amount by the next output from the asynchronous layer encoder, (2) generating a synchronous layer by deleting a just before output from the asynchronous layer encoder when the buffer exceeds a target bit amount; and re-coding the deleted asynchronous layer as the new synchronous layer, and (3) generating a synchronous layer when the buffer exceeds a target bit amount; and storing an excess bit in a packet or a time slot which stores a next synchronous layer.

In the present invention, when coding the moving picture image, a data unit including a synchronous signal corresponds or conforms to a data transmission unit on the network, or a synchronous signal is included in a position near a head of respective data transmission units on the network. Therefore, in the digital moving picture stream generated according to the invention, the header of the synchronous layer is included in every maximum length of the IP packet in the variable length packet switching method and in every size of the time slots in the variable bit rate TDM. In this case, if the coded digital moving picture stream obtained according to the invention is outputted from the packet generation as the data transmission unit i.e. as the IP packet or the time slot, a head of the IP packet or the time slot thus outputted necessarily includes the synchronous signal. Therefore, even if the disposal of the packet or the time slot occurs on the network, it is possible to maintain the synchronicity at the receiving side and thus a failure of the synchronicity in the variable length coding operation can not occur.

DESCRIPTION OF THE PREFERRED EMBODIMENT

Figure 1A:
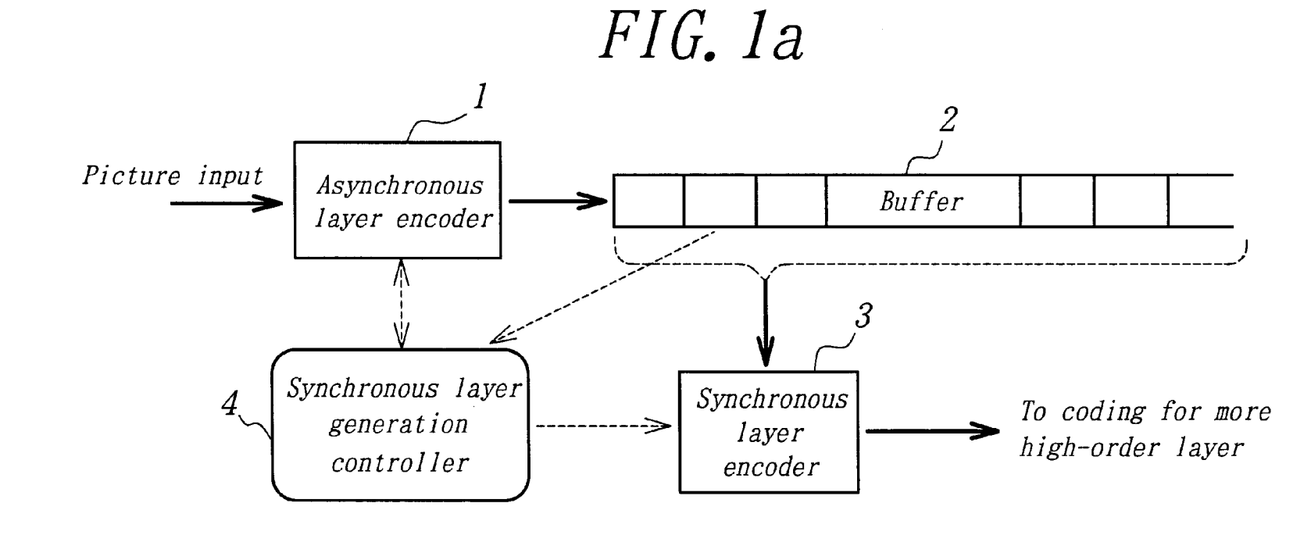
FIGS. 1a and 1b are schematic views respectively explaining a concept of the present invention.
Figure 1B:
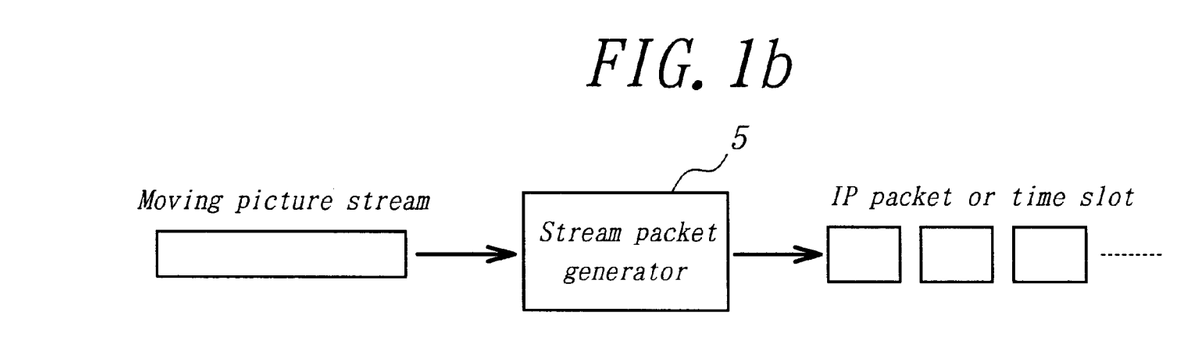

FIG. 1 is a schematic view explaining a concept of the present invention, in which FIG. 1a shows one structure of an apparatus for coding a moving picture image according to the invention and FIG. 1b illustrates one embodiment for transmitting a digital moving picture stream coded by the apparatus for coding the moving picture image according to the invention. The apparatus for coding the moving picture image according to the invention shown in FIG. 1a comprises an asynchronous layer encoder 1, a buffer 2, a synchronous layer encoder 3, and a synchronous layer generation controller 4. Moreover, as shown in FIG. 1b, when the digital moving picture stream coded by the apparatus for coding the moving picture image according to the invention is transmitted via a network, a streams packet generator 5 is used.

In the embodiment shown in FIG. 1a, the asynchronous layer encoder 1 functions to code the moving picture image till an uppermost layer having no synchronicity, in a hierarchical structure of a moving picture compression method. If use is made of an MPEG coding method, the moving picture image till a macro block is coded. The buffer 2 stores coded data outputted from the asynchronous layer encoder 1 in order. The synchronous layer encoder 3 functions to pick up the coded data stored in the buffer 2 and to code the moving picture image of a layer having synchronicity (and till a layer positioned upper than that layer) by inserting a synchronous signal. If use is made of the MPEG coding method, a slice header as the synchronous signal is inserted and the moving picture image of the slice layer (and till the layer positioned upper than the slice layer) is coded. The synchronous layer generation controller 4 functions to observe a bit amount of the coded data stored in the buffer 2 and to generate a coding instruction to the synchronous layer encoder 3. In the embodiment shown in FIG. 1b, the stream packet generator 5 functions to generate a packet by cutting a stream corresponding to a bit size of the packet or the time slot so as to transmit a coded stream via the network.

Then, a method for coding a moving picture image will be explained with reference to FIGS. 1a and 1b. The data coded till an asynchronous layer (corresponding to a macro block layer in the MPEG coding method) in the asynchronous layer encoder 1 are successively stored in the buffer 2. The synchronous layer generation controller 4 observes a data amount stored in the buffer 2 and generates the coding instruction to the synchronous layer encoder 3 when the data amount reaches to a maximum length of the IP packet or a size of the time slot. In the case that it is necessary to generate a synchronous layer even when the data amount in the buffer 2 does not reach to a target bit amount due to a coding standard (for example when the data amount reaches to a side end of the image in MPEG2 coding method), the synchronous layer is generated and a next synchronous layer is generated under a condition such that a short amount with respect to the target bit amount is assumed to be a new target bit amount. That is to say, a plurality of synchronous layers are stored simultaneously in the IP packet or the time slot.

Moreover, when multiplexing a voice and so on to the stream, a calculation is performed by adding a bit amount to be multiplexed or a bit amount required to a header and so on for multiplexing.

When receiving the coding instruction, the synchronous layer encoder 3 performs a data output operation by picking up all the data in the buffer 2, inserting the synchronous signal in the header of respective data, and coding the data of the synchronous layer (corresponding to the slice layer in the MPEG coding method) and till a layer positioned upper than that data. In the stream packet generator 5, the stream is cut along the synchronous layer generated corresponding to a size of the maximum packet or a size of the time slot by means of the synchronous layer generation controller 4 so as to generate a packet. In the variable bit rate TDM switching method, a stuffing bit is inserted in a remaining portion of the time slot and is outputted.

In the apparatus for coding the moving picture image according to the invention mentioned above, there are three methods, as shown in FIGS. 2–4 respectively, for generating the synchronous layer corresponding to the target bit amount (that is, the maximum length of the IP packet or the size of the time slot). In the present invention, all the three methods may be preferably utilized. Hereinafter, the three methods will be explained respectively.

Figure 2A:
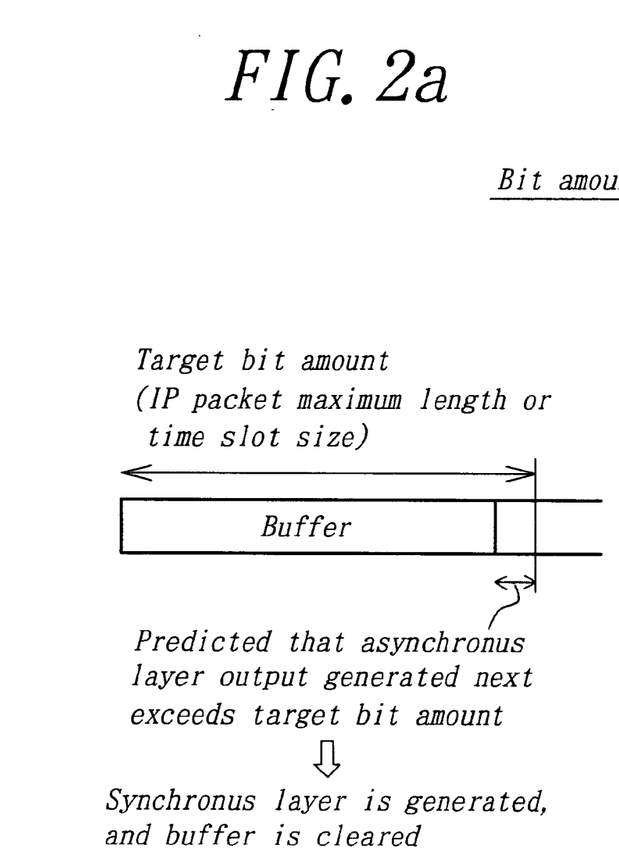
FIGS. 2a and 2b are schematic views respectively explaining a bit amount prediction method as one example of a synchronous layer generation according to the invention.
Figure 2B:
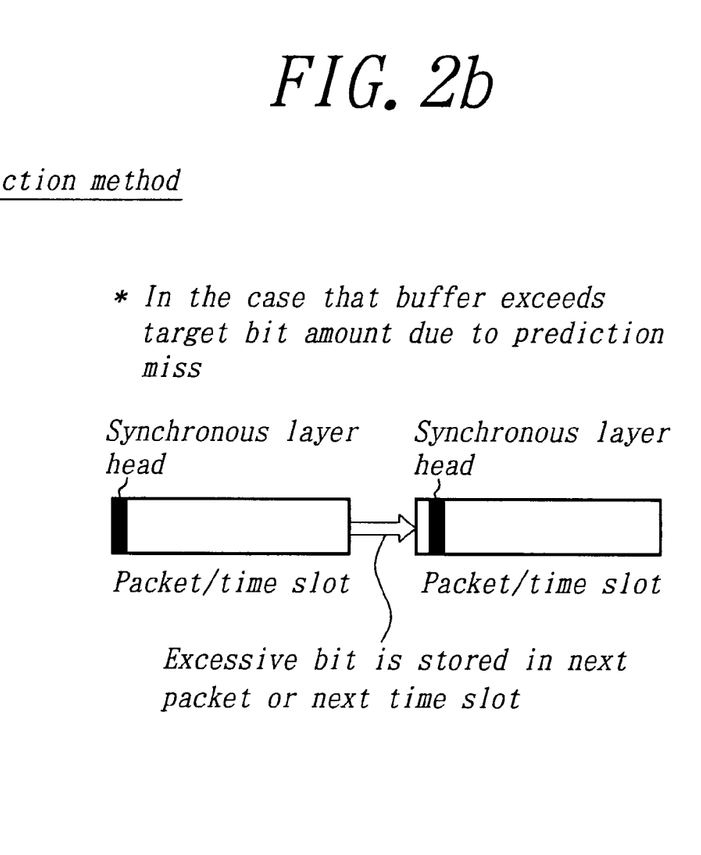

In a bit amount prediction method shown in FIGS. 2a and 2b, a bit amount generated from the output of the asynchronous layer encoder 1 is observed in each time, and the synchronous layer is generated at a timing at which the bit amount is predicted to exceed the target bit amount by the next output from the asynchronous layer encoder 1. In the case that the buffer exceeds the target bit amount due to a prediction miss, an excess bit is stored in the next packet or the next time slot as shown in FIG. 2b.

Figure 3:
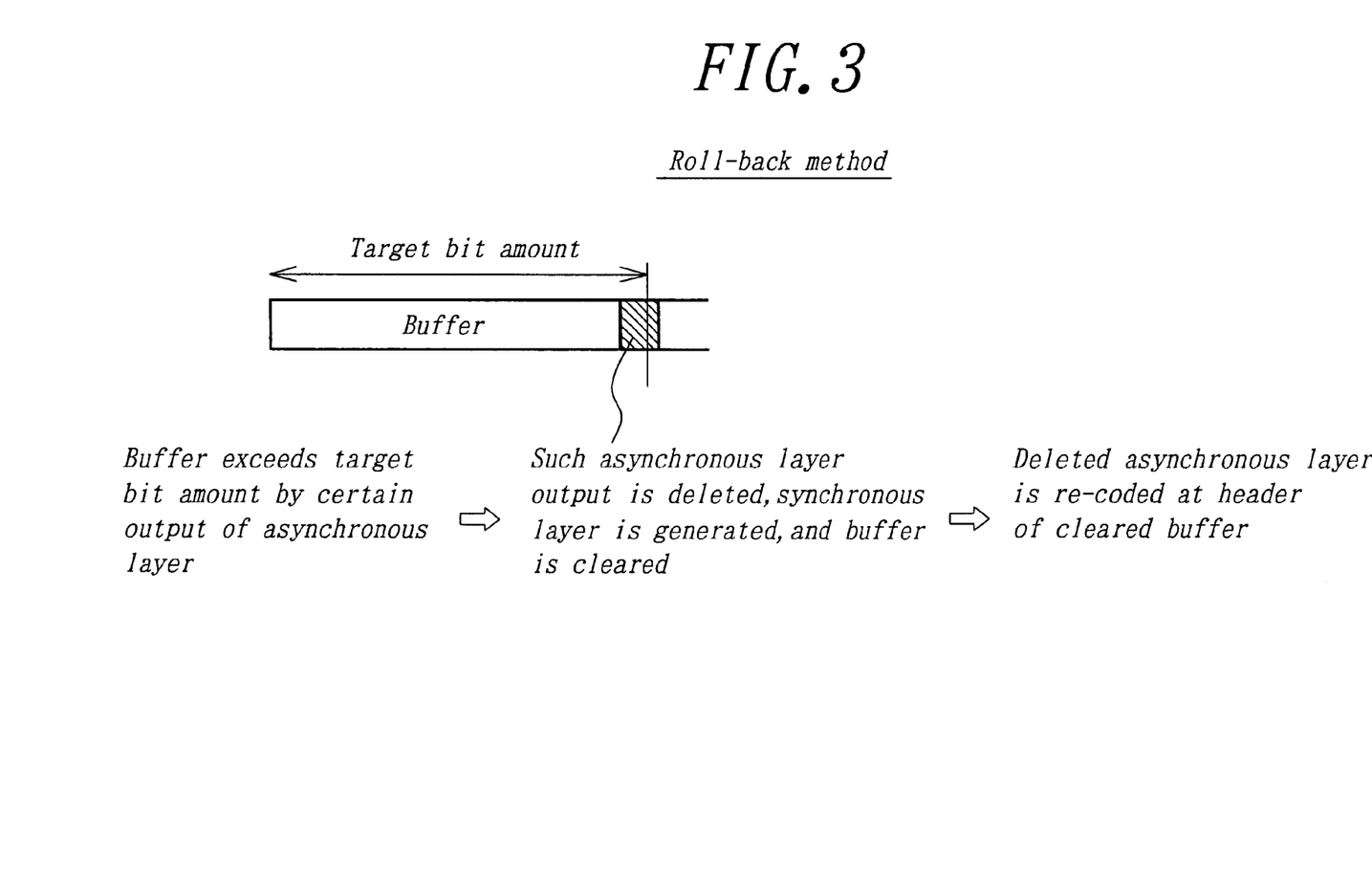
FIG. 3 is a schematic view respectively explaining a roll-back method as one example of the synchronous layer generation according to the invention.

In a roll-back method shown in FIG. 3, the synchronous layer is generated by deleting a just before output from the asynchronous layer encoder 1, when the buffer 2 exceeds the target bit amount, and the deleted asynchronous layer is re-coded as a new asynchronous layer. In this method, it is possible to make a size of the synchronous layer surely under the target bit amount, but the roll-back function, such that the same asynchronous layer is re-coded, is required for the asynchronous layer encoder 1.

Figures 4A, 4B:
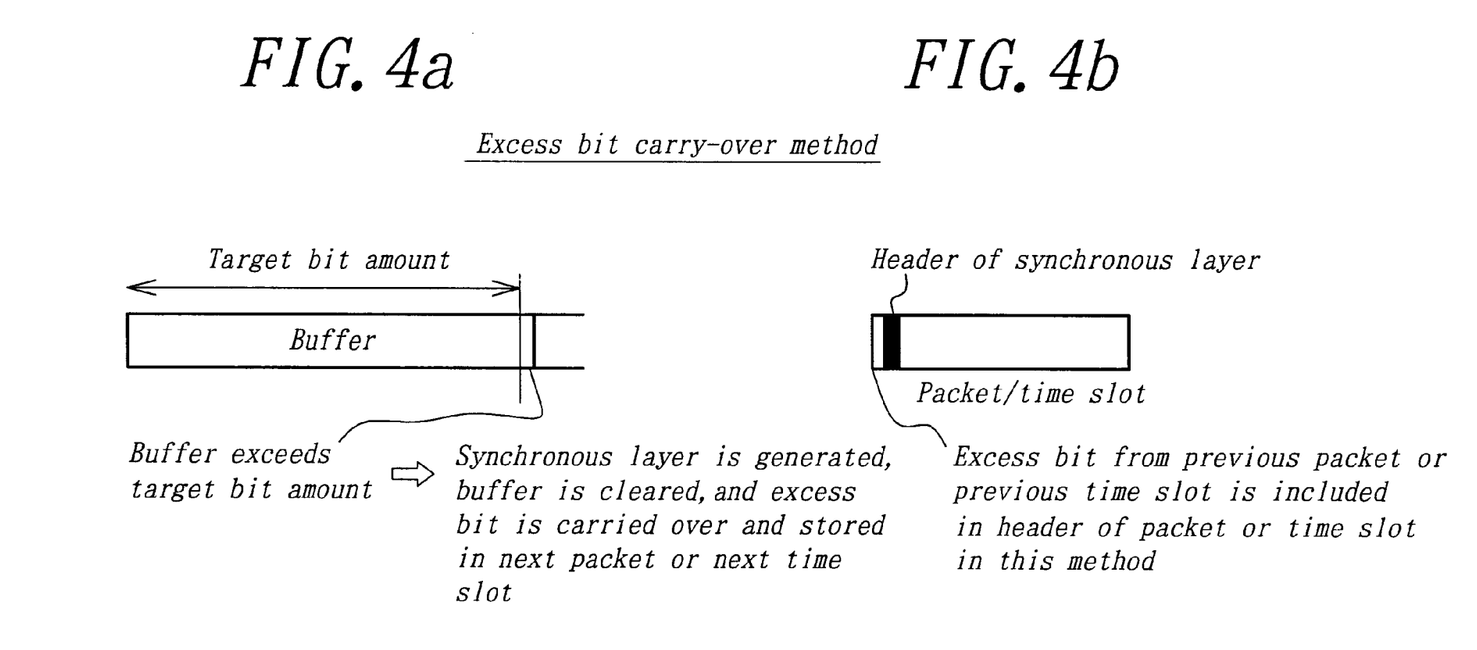
FIGS. 4a and 4b are schematic views respectively explaining an excess bit carry-over method as one example of the synchronous layer generation according to the invention.

In an excess bit carry-over method shown in FIGS. 4a and 4b, the synchronous layer is generated when the buffer 2 exceeds the target bit amount, and an excess bit is carried over and stored in the next packet or the next time slot. In this method, as shown in FIG. 4b, the excess bit from the previous packet or the previous time slot is always included in the header of the packet or the time slot, and the header of the synchronous layer is continuously stored.

In the present invention, since the synchronous layer is generated corresponding to the target bit amount (that is, the maximum length of the IP packet or the size of the time slot) which is the data transmission unit on the network by utilizing the above mentioned bit amount prediction method, roll-over method and excess bit carry-over method, the header of the synchronous layer is inserted in each data transmission unit, for example, in each maximum length of the IP packet in the variable length packet switching method or each size of the time slot in the variable bit rate TDM switching method, in the digital moving picture stream generated according to the invention. Moreover, in the case that the prediction is missed in the bit amount prediction method, or also in the excess bit carry-over method, the synchronous signal is necessarily included just before the IP packet which is a data transmission unit of the network or just after the excess bit from the time slot.

Figure 5A:
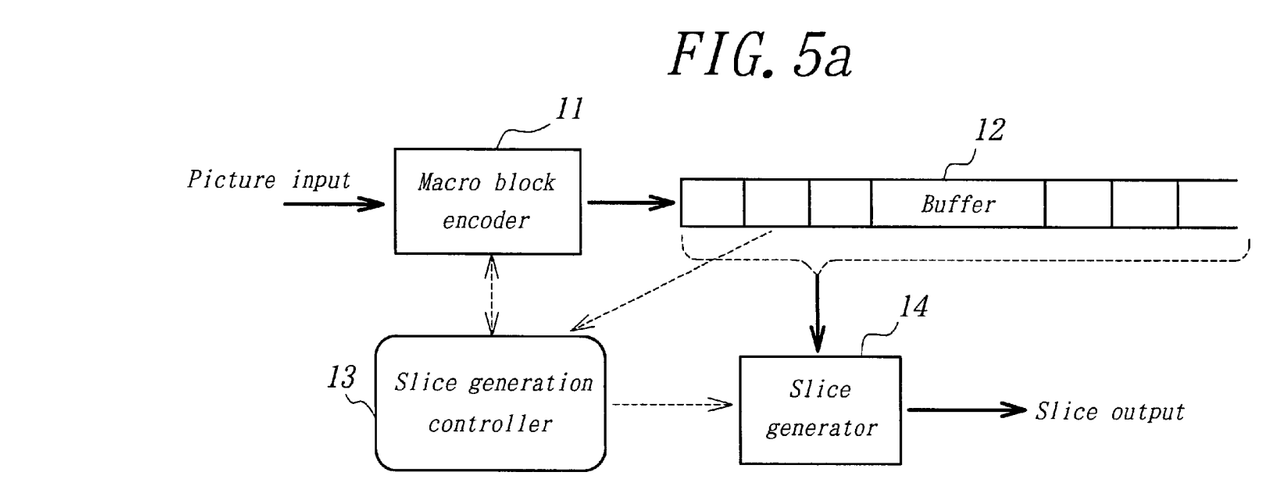
FIGS. 5a and 5b are schematic views respectively showing one embodiment in which the present invention is applied to an MPEG video stream of a variable bit rate TDM switching method.
Figure 5B:
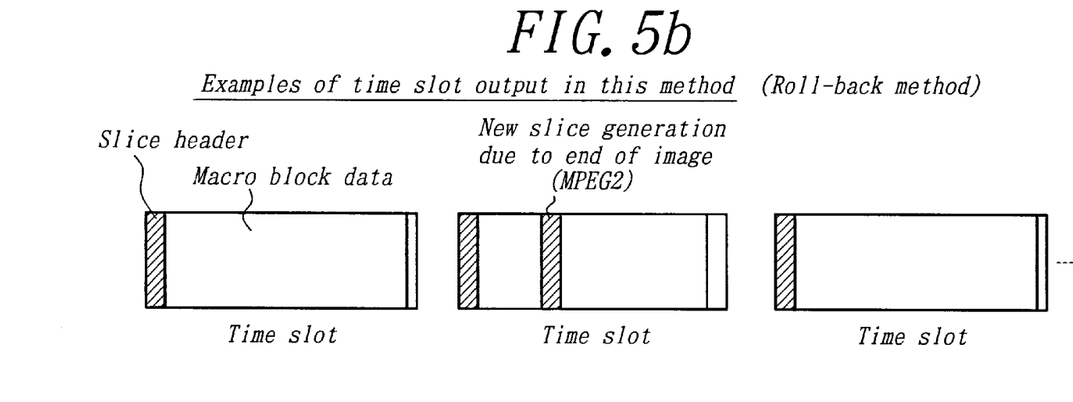

FIGS. 5a and 5b are schematic views respectively showing one embodiment in which the present invention is applied to the MPEG video stream in the variable bit rate TDM switching method and the above mentioned roll-back method is utilized for generating a slice layer. At first, in FIG. 5a, an output of a macro block encoder 11 is stored in a buffer 12. Then, when the buffer 12 reaches to an uppermost bit amount storage in the time slot under an observation of a slice generation controller 13, the data stored in the buffer 12 are picked up and are outputted in addition to a slice synchronicity performed in a slice generator 14. In this manner, the digital moving picture stream is obtained. When the thus obtained stream is transmitted via the network, the stream is cut corresponding to a slice generated with taking into consideration of a slot size, and is stored in the time slot. As a result, as shown in FIG. 5b, a slice header necessarily exists in the header of respective time slots.

As mentioned above, in the case that the present invention is utilized for the variable bit rate TDM switching method, as compared with the known case such that an output of the MPEG encoder is divided per the synchronous layer and is stored, since a data unit of the synchronous layer is always identical with the time slot size, a slot using efficiency can be improved. Particularly, in the case that use is made of the excess bit carry-over method mentioned above, the slot using efficiency can be made to 100%.

As is clearly understood from the above explanations mentioned above, according to the invention, when coding the moving picture image, a data unit including a synchronous signal corresponds or conforms to a data transmission unit on the network, or a synchronous signal is included in a position near a head of respective data transmission units on the network. Therefore, in the digital moving picture stream generated according to the invention, the header of the synchronous layer is included in every maximum length of the IP packet in the variable length packet switching method and in every size of the time slots in the variable bit rate TDM. In this case, if the coded digital moving picture stream obtained according to the invention is outputted from the packet generation as the data transmission unit i.e. as the IP packet or the time slot, a head of the IP packet or the time slot thus outputted necessarily includes the synchronous signal. Therefore, even if the disposal of the packet or the time slot occurs on the network, it is possible to maintain the synchronicity at the receiving side and thus a failure of the synchronicity in the variable length coding operation can not occur.

What is claimed is:

1. An apparatus for coding a moving picture image, in which the moving picture is coded into a digital moving picture stream when the moving picture image is transmitted via a network and further in which the moving picture image is coded in such a manner that a data unit including a synchronous signal corresponds to a data transmission unit on the network, comprising;

an asynchronous layer encoder for performing a coding operation of the moving picture image till an uppermost layer having no synchronicity, in a hierarchical structure of a moving picture compression method;

a buffer for storing coded data outputted from the asynchronous layer encoder in order;

a synchronous layer encoder for picking up the coded data stored in the buffer and performing a coding operation of the moving picture image of a layer have synchronicity and till a layer positioned upper than that layer by inserting the synchronous signal, to obtain a digital moving picture stream; and a synchronous layer generation controller for observing a data amount of the coded data stored in a buffer and generating a coding instruction to the synchronous layer encoder when the data amount reaches to the data transmission unit on the network.

2. The method for coding a moving picture image according to claim 1, wherein the network utilizes a variable length packet switching method such as an IP network or a variable bit rate TDM (Time Division Multiplex) method.

3. The method for coding a moving picture image according to claim 1, wherein the coding of the moving picture image is based on MPEG (Moving Picture Experts Group) method.

4. The apparatus for coding a moving picture image according to claim 1, wherein the generation of the coding instruction in the synchronous layer generation controller is performed by; observing a bit amount generated from an output of the asynchronous layer encoder in each time; and predicting a timing at which the bit amount exceeds a target bit amount by the next output from the asynchronous layer encoder.

5. The apparatus for coding a moving picture image according to claim 1, wherein the generation of the coding instruction in the synchronous layer generation controller is performed by; generating a synchronous layer by deleting a just before output from the asynchronous layer encoder when the buffer exceeds a target bit amount; and re-coding the deleted asynchronous layer as a new synchronous layer.

6. The apparatus for coding a moving picture image according to claim 1, wherein the generation of the coding instruction in the synchronous layer generation controller is performed by; generating a synchronous layer when the buffer exceeds a target bit amount; and storing an excess bit in a packet or a time slot which stores a next synchronous layer.

* * * * *